United States Patent [19]

de Larosiere de Champfeu

[11] 4,075,853
[45] Feb. 28, 1978

[54] SOIL INJECTION MACHINE

[75] Inventor: Pierre J. de Larosiere de Champfeu, Lisbon, Portugal

[73] Assignee: The International Synthetic Rubber Company, Ltd., Southampton, England

[21] Appl. No.: 727,776

[22] Filed: Sep. 29, 1976

[51] Int. Cl.² .............................................. E02D 3/12
[52] U.S. Cl. .................................. 61/36 R; 404/96; 404/101; 404/105
[58] Field of Search ................... 61/35, 36, 63, 10, 11; 404/96, 105, 101

[56] References Cited

U.S. PATENT DOCUMENTS 1,320,273  10/1919  Price .................... 404/101

FOREIGN PATENT DOCUMENTS 2,339,777  2/1975  Germany ................... 61/35
6,806,970  6/1969  Netherlands ............... 61/35

*Primary Examiner*—Jacob Shapiro
*Attorney, Agent, or Firm*—Cushman, Darby & Cushman

[57] ABSTRACT

A machine for the injection of liquid into the surface of soil comprises a sledge having a surface compacting base bounded by two runners, the lower surface of each runner being below the level of the compacting base. The base has a transverse slot dimensioned to receive a hollow pressurizable injection bar which has a lower face equipped with injection orifices, the lower face being flush with the compacting surface of the compacting base when the bar is in position. The machine is particularly useful for the injection of a soil stabilizing medium into soil while the soil is compacted. By this means it is possible to produce a compacted raised strip of soil which is smooth and stable and which in desert conditions prevents a build up of sand on roads.

The invention includes a method for stabilizing soil by forming a compacted raised strip of soil and injecting a soil stabilizing medium into said strip to bond the compacted soil.

5 Claims, 11 Drawing Figures

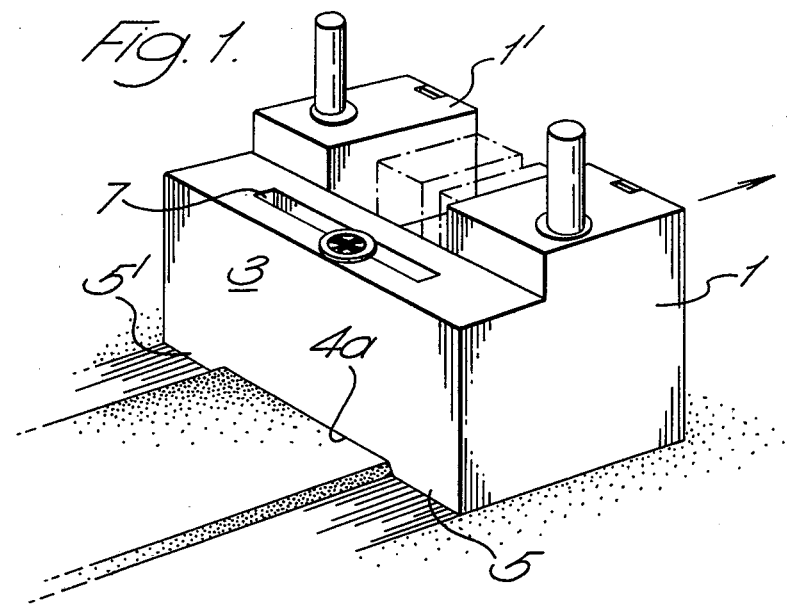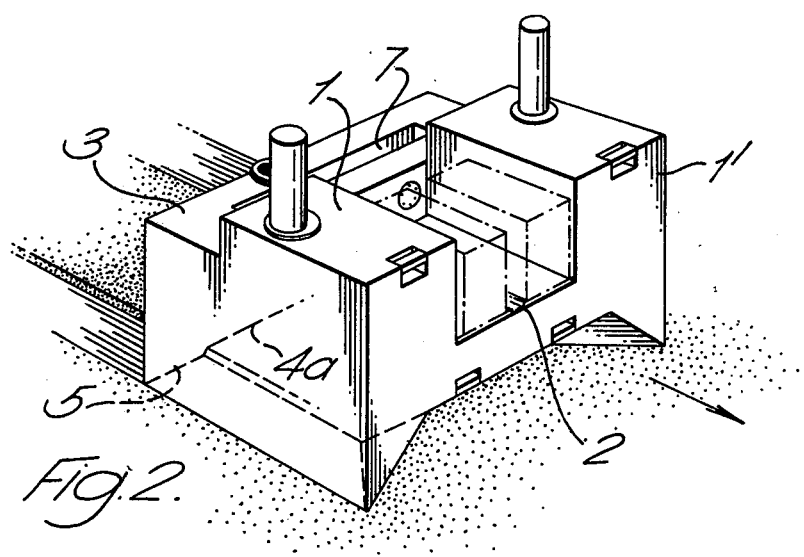

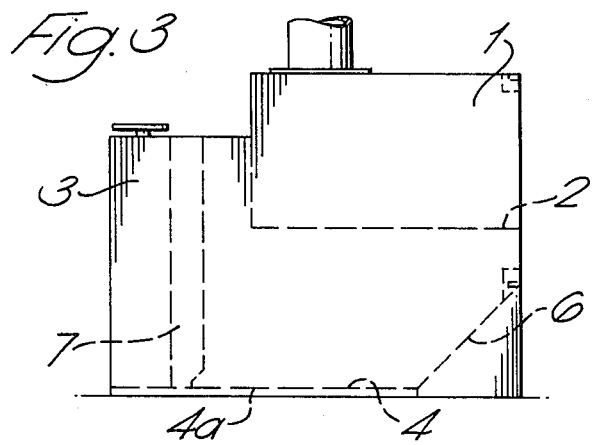
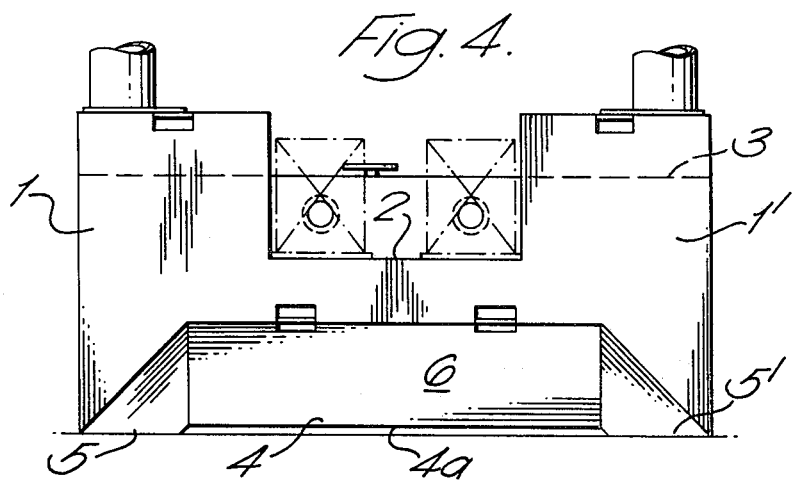
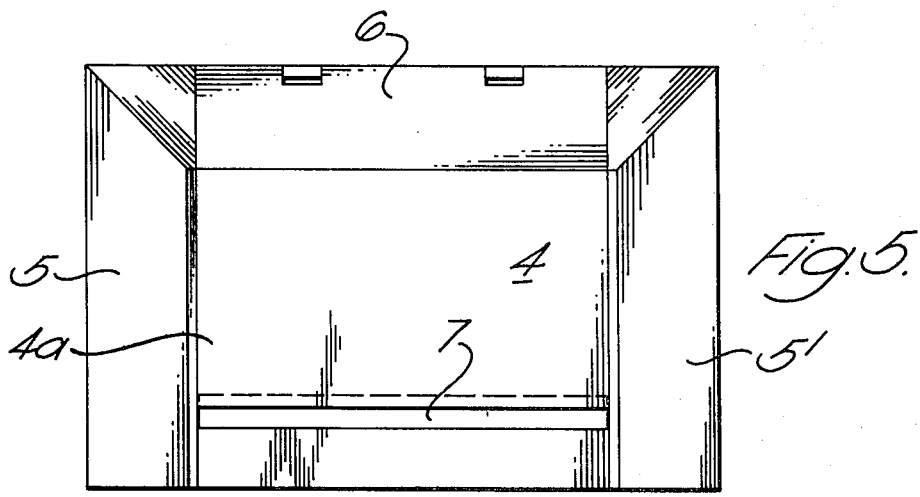

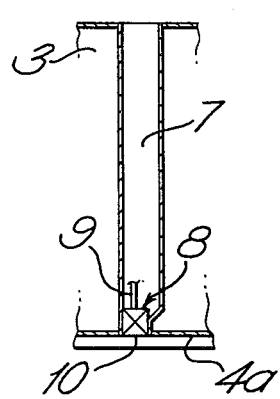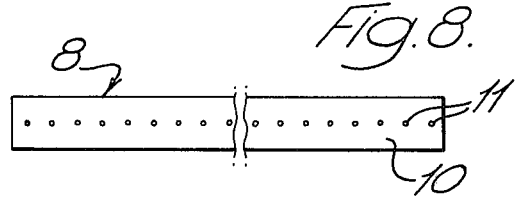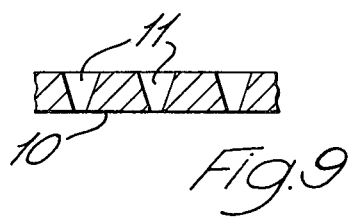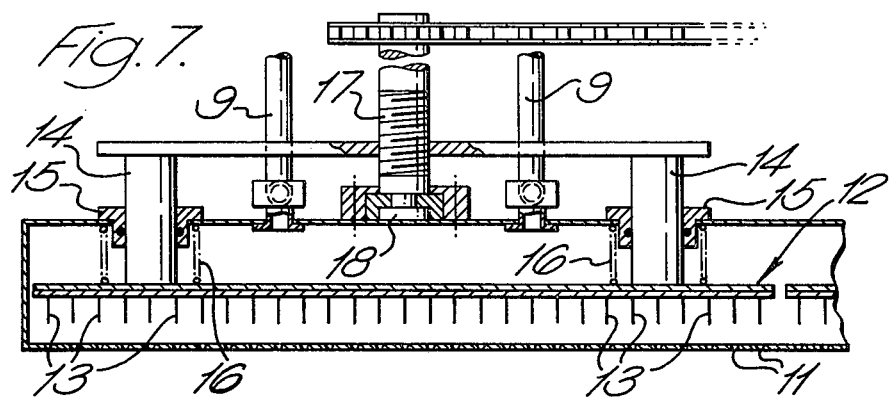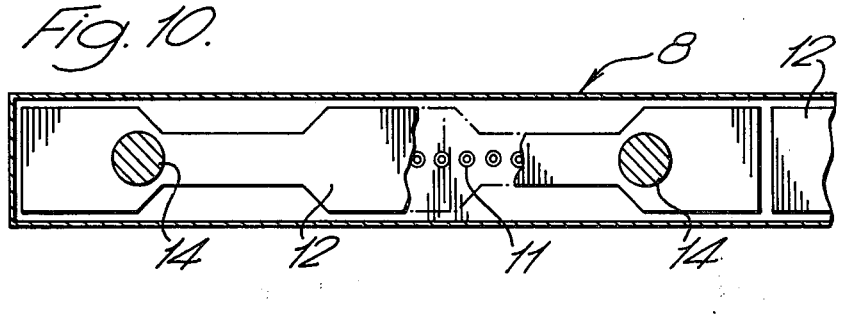

SOIL INJECTION MACHINE

This invention relates to a machine for injection of soil and, in a particular embodiment, to the use of the machine for the application to the soil of a stabilising medium in order to stabilise the soil surface. In this specification the word "soil" is used to mean particulate material, such as sand, irrespective of whether or not the material can support plant life.

In British Patent No. 1,007,671, we have described a process for the treatment of soil with particular reference to combating erosion. Soil erosion is a phenomenon occurring in a wide variety of situations. It is encountered on a very wide scale in desert areas and along coastlines where in each case there is a large expanse of sand. The sand is blown about the wind, forming sand dunes and swirling over solid surfaces, such as roads covering them with layers of sand. In this way the sand interferes with the everyday life of mankind in such areas.

In the process described in British Patent No. 1,007,671, a latex of an oil extended rubber is applied to the surface of the soil. The oil extended rubber latex stabilises the surface by the formation of a flexible coherent film or blanket of soil particles bound together by the latex.

In U.S. Pat. No. 3,337,987, we have described another method of combating erosion which comprises applying to the soil surface an aqueous dispersion of a rubber latex and a bitumen emulsion.

It is also known to use oil or a bitumen emulsion, per se, as soil stabilising medium.

In the processes described in the two aforementioned patents the stabilising medium, i.e., the oil extended rubber latex or the rubber latex/bitumen emulsion, can be applied by spraying using a knapsack sprayer or a spray boom attached to a tractor, a helicopter or a light aircraft.

Spraying methods have the disadvantage that the stabilised layer is generally limited to a depth of about 2 cm. This in turn limits the life of the protective layer so that permanent protection is not obtained. In order to increase the depth of the stabilised layer physical mixing methods have been used in which the stabilising medium is applied to the soil by spraying and is then mixed therewith by the means of rotovators, discs or scrapers. However, in such methods the top layer of sand is disturbed requiring a considerable amount of energy and the consumption of stabilising medium is high. An additional disadvantage is that it is usually necessary to compact the surface after application, using rollers.

We have now devised a machine which may be used to apply stabilising medium to a soil surface so that adequate penetration of the medium is obtained which at the same time obviates the disadvantages just referred to.

According to the present invention a machine for the injection of liquid into the surface of soil comprises a sledge having a surface-compacting base, the base having a transverse slot dimensioned to receive a hollow pressurisable injection bar which has a lower face equipped with injection orifices, the lower face of the bar being flush with the compacting surface of the base, when the bar is in position.

The present invention further provides a method for stabilising soil comprising forming a compacted raised strip of soil and injecting a stabilising medium into said strip whereby to bond the compacted soil.

In a preferred embodiment the base of the machine has two runners, the lower surface of each runner being below the level of the compacting base.

A specific embodiment of the machine will now be described with reference to the accompanying drawings in which:

FIGS. 1 and 2 are general isometric views of the machine:

FIG. 3 is a side elevation:

FIG. 4 is a front view:

FIG. 5 is an underneath view:

FIG. 6 is a cross section of the slot, shown dotted in FIG. 3 with the injection bar in place:

FIG. 7 is a cut-away view of the injection bar with associated pricking bar and assembly in elevation:

FIG. 8 is an underneath view of the injection bar:

FIG. 9 is a cross section of injection orifices of the injection bar:

FIg. 10 is a plan view partly cut away of the pricking bar:

Figure 11:
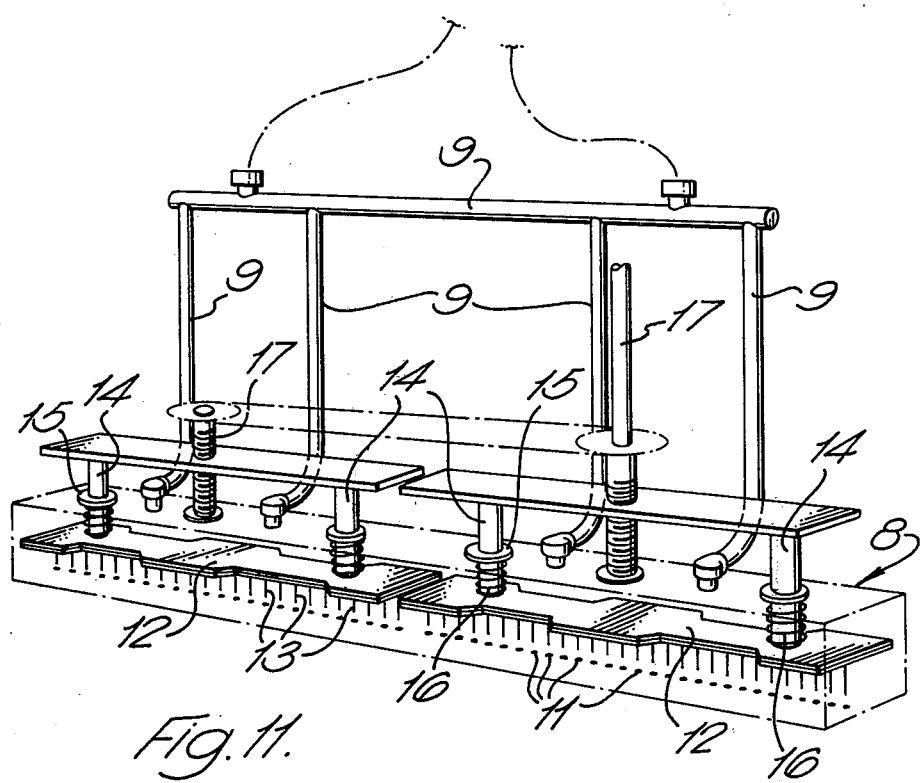
FIG. 11 is a general view, part cut away, of the pricker bar/injection bar assembly, as seen from above.

Referring to the drawings, the machine comprises two reservior tanks 1,1' for holding the liquid to be injected, connected by a platform 2 which can accommodate pressurising means for the pressurisable injection bar.

An injection compartment 3 extends rearward from the platform 2 at a lower level and is integral with the tanks 1 and platform 2. The machine has a compacting base 4 having two runners 5,5'integral with, and on opposite sides of, the base 4. The lower surface of each runner is below the level of the compacting surface 4a of the base 4. The base has an inclined front 6, forming a bow. The inner sides of each runner may be inclined inwards, if desired, as shown in the drawings. A vertical transverse slot 7 is housed in the injection compartment 3 and extends to the base 4. At the base, the slot 7 is dimensioned to receive a hollow pressurisable injection bar 8 equipped with supply lines 9. The slot need not be of uniform vertical cross section. Preferably the slot has a wider upper section as shown in FIG. 6 for ease of insertion of the injection bar. When the injection bar is in position the lower face of the bar is flush with the compacting surface 4a of the compacting base 4. The bar may be provided with hooking points for raising the bar. One form of injection bar is shown in FIGS. 7 to 11. In this case the bar is a hollow rectangular box pressurisable by means of supply pipes 9.

The lower face 10 of the bar 8 is equipped with a line of injection orifices 11. A detail of the orifices is shown in FIG. 9, this cross section producing a low pressure drop.

One problem which may be encountered using the machine with soil stabilising mediums,such as those described above, is that the injection orifices become blocked. However, this problem does not normally arise with aqueous solutions, such as fertiliser solutions, for which the machine of the invention may be used.

In one embodiment of the invention we have solved this problem by means of an unblocking device or pricking bar illustrated in FIGS. 7, 10 and 11 of the accompanying drawings.

The pricking bar 12, carrying prickers 13 aligned with the injection orifices 11, is contained within the injection bar 8 and supported therein by guide rods 14, passing through the top face of the bar 8 via sealed bushes 15. Springs 16 may be interposed between the pricking bar 12 and the top face of the bar 8. The pricking bar 12 may be raised and lowered via a rotatable screw 17 mounted in bearing 18 attached to the top face of bar 8. If desired, the pricking bar 12 may be waisted, as shown in FIG. 10, to ease raising and lowering of the bar when the injection bar 8 is full of liquid and to permit passage of liquid to the orifices 11. Where the machine is very wide it is convenient to have two linked pricker bars, as shown in FIG. 11.

In use, the reservoir tanks 1,1' are filled with the liquid to be injected and the tanks are connected to the suction side of a pressurising means, normally a pump or pumps, mounted on platform 2. The injection bar 8 is lowered into the slot 7 and forced downwards so that the lower face 10 of the bar is flush with the compacting surface 4a of the compacting base 4. It is then connected to the pressure side of the pressurising means so that when the pressurising means is started the liquid to be injected is withdrawn from the reservoir tanks 1,1' and applied under pressure to the injection bar 8. The front of the machine is connected to a traction means, such as a tracked tractor, so that it can be towed over the soil.

When all is ready, an operator on the machine starts the pressurising means, raises the pricking bar 12 and the tractor is moved over the soil, towing the machine. The bow 6 of the machine and the sides of the runners 5,5' form the soil into a shallow raised strip of compacted, profiled soil having the same width as between the runners. In this way the soil is compacted and the compacting action is reinforced by the weight of the machine bearing upon the soil. The runners also assist in guiding the machine over the area of soil being treated. Simultaneously liquid is injected into the compacted soil via the injection bar 8. In this manner as the tractor and machine progress across the soil a raised strip of soil, which has been injected under compaction with stabilising medium using the energy from the pump, is produced.

Whilst the machine may be used to inject any liquid into soil, we have found that it is ideal for use in soil stabilisation by means of a soil stabilizing medium such as those referred to above. Thus using an oil extended rubber latex, a mixture of a rubber latex and a bitumen emulsion or a bitumen emulsion alone, the soil may be injected under compaction with the medium to obtain a substantially uniform layer of bonded soil. The depth of the layer may be varied by varying the pressure of the pump. The dimensions of the raised strip of soil are determined by the width between the runners 5,5' and the depth between compacting base 4 and the lower surface of the runners which may be, for example, 5 centimetres. The width between the runners may be, for example, 2 metres and each runner may have a width of, for example, ½ metre. Typically the depth of penetration of the stabilising medium may be 3 to 10 centimetres or more. A depth of 5 to 8 centimetres is ideal for most soil stabilisation applications. The treated strip has a good surface finish and, moreover, the soil may be treated in a fast and efficient manner.

A particular use of the machine of the present invention is in the formation of wide smooth strips of stabilised sand, alternating with strips of untreated sand alongside roads in desert areas. Wind moving across the untreated sand encounters a smooth treated strip. Immediately the wind accelerates and its capacity to carry sand increases to a maximum. At the far edge of the strip the wind moves over a strip of untreated sand again and its speed begins to decrease. However, before the wind reaches its original speed it encounters a second smooth treated strip and once again its speed accelerates to a maximum. In this way wind carries the sand over the treated strips, over the road, over more treated strips, keeping the road clear of sand using aerodynamic principles alone. If the stabilising medium used in the treatment contains a rubber latex the treated strips retain their flexibility. If sand is removed from the edge of the strip, the edge folds into a new shape. After a relatively short period the shape of the edge becomes aerodynamically stabilised and no further erosion takes place.

By careful choice of stabilising medium, strips of stabilised sand may be produced having a life of many years, thus providing a near permanent solution to the problem of keeping desert roads clear of sand.

What I claim is:

1. A machine for the injection of a stabilizing liquid into the surface of soil comprising a sledge having a surface compacting base, the base having a forward end and a rear end, a transverse slot located adjacent said rear end, a hollow pessurizable injection bar disposed in said slot, said bar having a lower face equipped with injection orifices, said lower face of said bar being flush with said compacting surface of said base so that, in use, a strip of compacted soil bonded with the stabilizing liquid is produced.

2. The machine as claimed in claim 1 wherein said pressurizable injection bar is provided with means for unblocking said injection orifices.

3. A machine according to claim 1 having two runners, the lower surface of each runner being below the level of the compacting base.

4. A method for stabilizing soil comprising forming a compacted raised strip of soil and injecting a soil stabilisting medium into said strip whereby to bond the compacted soil.

5. A method according to claim 3 wherein the soil stabilising medium is selected from an oil extended rubber latex, an oil emulsion, a bitumen emulsion, a bitumen-oil emulsion or a mixture of one or more of such emulsions with a rubber latex.

* * * * *